(12) United States Patent
Miyamoto et al.

(10) Patent No.: US 9,546,733 B2
(45) Date of Patent: Jan. 17, 2017

(54) PISTON

(75) Inventors: Kazushi Miyamoto, Tokyo (JP);
Hirofumi Higashi, Tokyo (JP); Jun Hoshikawa, Tokyo (JP); Akihiro Fujimoto, Tokyo (JP); Noritsugu Ohsawa, Tokyo (JP); Kiminari Kato, Tokyo (JP); Seiji Matsuda, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 416 days.

(21) Appl. No.: 13/976,252

(22) PCT Filed: Dec. 22, 2011

(86) PCT No.: PCT/JP2011/079863
§ 371 (c)(1),
(2), (4) Date: Jun. 26, 2013

(87) PCT Pub. No.: WO2012/090872
PCT Pub. Date: Jul. 5, 2012

(65) Prior Publication Data
US 2013/0269515 A1    Oct. 17, 2013

(30) Foreign Application Priority Data

Dec. 27, 2010  (JP) .................................. 2010-291290

(51) Int. Cl.
*F16J 1/00*         (2006.01)
*F02F 3/00*         (2006.01)
(Continued)

(52) U.S. Cl.
CPC .................. *F16J 1/00* (2013.01); *F02B 41/00* (2013.01); *F02B 75/044* (2013.01); *F02B 75/38* (2013.01);
(Continued)

(58) Field of Classification Search
CPC .................. F16J 1/005; F16J 1/06; F02F 3/22; F02B 75/044; F04B 27/0442; F04B 53/147
(Continued)

(56) References Cited

U.S. PATENT DOCUMENTS 1,252,269 A * 1/1918 Johnson et al. ...... F02B 75/044
                                                    123/78 B
1,905,157 A * 4/1933 Cox .............................. 92/224
(Continued)

FOREIGN PATENT DOCUMENTS

CN        2360623 Y     1/2000
DE     34 14 041 A1    10/1984
(Continued)

OTHER PUBLICATIONS

JP54091508—Machine Translation from USPTO STIC, Piston Structure of Internal Combustion Engine, Pub date—1979.*
(Continued)

*Primary Examiner* — John K Fristoe, Jr.
*Assistant Examiner* — Matthew Wiblin
(74) *Attorney, Agent, or Firm* — Birch, Stewart, Kolasch & Birch, LLP (57) ABSTRACT

This invention provides a piston in which the moving piston unit can be prevented from rotating with respect the base piston unit, while suppressing the increase of the sliding resistance the piston has with respect to the cylinder. The circumferential wall of the moving piston unit has a pair of skirt parts opposing each other across a piston boss and a pair of side-wall parts coupling the skirt parts and each having an outer circumferential surface concaved toward the central axis X1 of the piston. The side-wall parts have a penetration part each, which penetrates the side-wall part and extends in the directions the moving piston unit recip-
(Continued)

rocates with respect to the base piston unit. The base piston unit has rotation preventing projections that project perpendicular to the central axis of the piston and are inserted into the penetration parts.

13 Claims, 4 Drawing Sheets (51) Int. Cl.
*F16J 1/16* (2006.01)
*F02B 41/00* (2006.01)
*F02B 75/04* (2006.01)
*F02B 75/38* (2006.01)

(52) U.S. Cl.
CPC .............. *F02F 3/0015* (2013.01); *F16J 1/006* (2013.01); *F16J 1/16* (2013.01)

(58) Field of Classification Search
USPC .................................................. 92/255, 256
See application file for complete search history.

(56) References Cited

U.S. PATENT DOCUMENTS

| | | | | |
|---|---|---|---|---|
| 2,472,928 A * | 6/1949 | Tien | ...................... | F02B 75/044 123/78 R |
| 4,510,895 A * | 4/1985 | Slee | ................... | F02B 23/0603 123/193.6 |
| 5,279,268 A * | 1/1994 | Brink et al. | ................ | 123/197.2 |
| 5,499,572 A * | 3/1996 | Cobble | ............................ | 92/212 |
| 5,755,192 A * | 5/1998 | Brevick | ....................... | 123/78 B |
| 6,966,282 B2 * | 11/2005 | Hirano | ................... | F02B 75/044 123/48 B |
| 7,284,512 B2 * | 10/2007 | Hirano | ................... | F02B 75/044 123/48 B |
| 7,318,397 B2 * | 1/2008 | Ward | ....................... | F02B 75/04 123/197.1 |
| 7,334,554 B2 * | 2/2008 | Galvin | ......................... | 123/193.6 |
| 7,637,241 B2 * | 12/2009 | Styron | ........................ | 123/193.6 |
| 8,171,842 B2 * | 5/2012 | Walker et al. | ................... | 92/218 |
| 2002/0046593 A1 * | 4/2002 | Ribeiro | ..................... | B21K 1/18 72/377 |
| 2009/0314244 A1 | 12/2009 | Yang et al. | | |

FOREIGN PATENT DOCUMENTS

| | | | | |
|---|---|---|---|---|
| DE | 197 47 746 C1 | 11/1998 | | |
| FR | 1354880 A | * | 3/1964 | ............ F02B 75/044 |
| JP | 54091508 | * | 1/1979 | |
| JP | 54-91508 U1 | | 6/1979 | |
| JP | 60-175749 A | | 9/1985 | |
| JP | 6-17665 A | | 1/1994 | |
| JP | 2001-193510 A | | 7/2001 | |
| JP | 2009144595 A | * | 7/2009 | ................ F02F 3/00 |

OTHER PUBLICATIONS

Chinese Office Action mailed Dec. 3, 2014 for Appln. No. 201180062693.1 with an English translation.
European Search Report dated Aug. 4, 2014 issued in counterpart European Application No. EP 11 85 3663.

* cited by examiner

PISTON

CROSS REFERENCE TO RELATED APPLICATIONS

This application is the National Phase of PCT/JP2011/079863 filed on Dec. 22, 2011, which claims priority under 35 U.S.C. 119(a) to Patent Application No. 2010-291290 filed in Japan on Dec. 27, 2010, all of which are hereby expressly incorporated by reference into the present application.

TECHNICAL FIELD

The present invention relates to a piston for use in, for example, reciprocating internal combustion engines.

BACKGROUND ART

A piston has hitherto been proposed, which comprises an outer piston (moving piston unit) and an inner piston (base piston unit). The inner piston is a component not integral with the outer piston, and has a piston boss to which a connecting rod may be coupled. The outer piston is able to reciprocate with respect to the inner piston. The piston of this type has a rotation preventing structure that prevents the outer piston from rotating with respect to the inner piston.

More specifically, the outer piston has a circumferential wall part all surrounding the inner piston. A hole is made in the circumferential wall. Through the hole and the piston boss, a rotation preventing member extends, preventing the outer piston from rotating with respect to the inner piston. The wall appears like a hollow cylinder. Such a technique is disclosed in, for example, JP H06-17665A.

SUMMARY OF THE INVENTION

Object of the Invention

As described in JP H06-17765A, however, when the piston is inserted in a cylinder, the rim of the hole made in the wall, which looks like a hollow cylinder, slides on the inner surface of the cylinder, inevitably scraping lubricating oil from the cylinder. Once the rim of the hole has scraped the lubricating oil, the sliding resistance the piston has with respect to the cylinder will increase.

An object of this invention is to provide a piston in which the moving piston unit can be prevented from rotating with respect the base piston unit, while suppressing the increase of the sliding resistance the piston has with respect to the cylinder.

Means for Achieving the Object

The piston described in claim 1 comprises: a base piston unit comprising a piston boss having a pin hole; a moving piston unit having a piston head and circumferential wall parts surrounding an entire circumference of the piston head and extending in reciprocation directions of the piston, holding the base piston unit in the circumferential wall parts and being able to reciprocate with respect to the base piston unit; and an elastic member provided between the base piston unit and the moving piston unit and configured to expand and contract as the moving piston unit reciprocates with respect to the base piston unit. The circumferential wall parts have a pair of skirt parts opposing each other across the piston boss and a pair of side-wall parts coupling the skirt parts and each having an outer circumferential surface concaved toward a central axis of the piston. Each of the side-wall parts have a penetration part, which penetrates the side-wall part and which extends in the reciprocation directions. The base piston unit has projections extending perpendicular to the central axis of the piston and inserted in the penetration parts.

In the piston described in claim 2, the penetration parts open at a side facing away from the piston head in the reciprocation directions.

In the piston described in claim 3, the penetration parts and the projections are arranged in a plane including the central axis of the piston and a central axis of the pin hole.

Advantages of the Invention

The present invention can provide a piston in which the moving piston unit can be prevented from rotating with respect the base piston unit, while suppressing the increase of the sliding resistance the piston has with respect to the cylinder.

MODE FOR CARRYING OUT THE INVENTION

Figure 1:
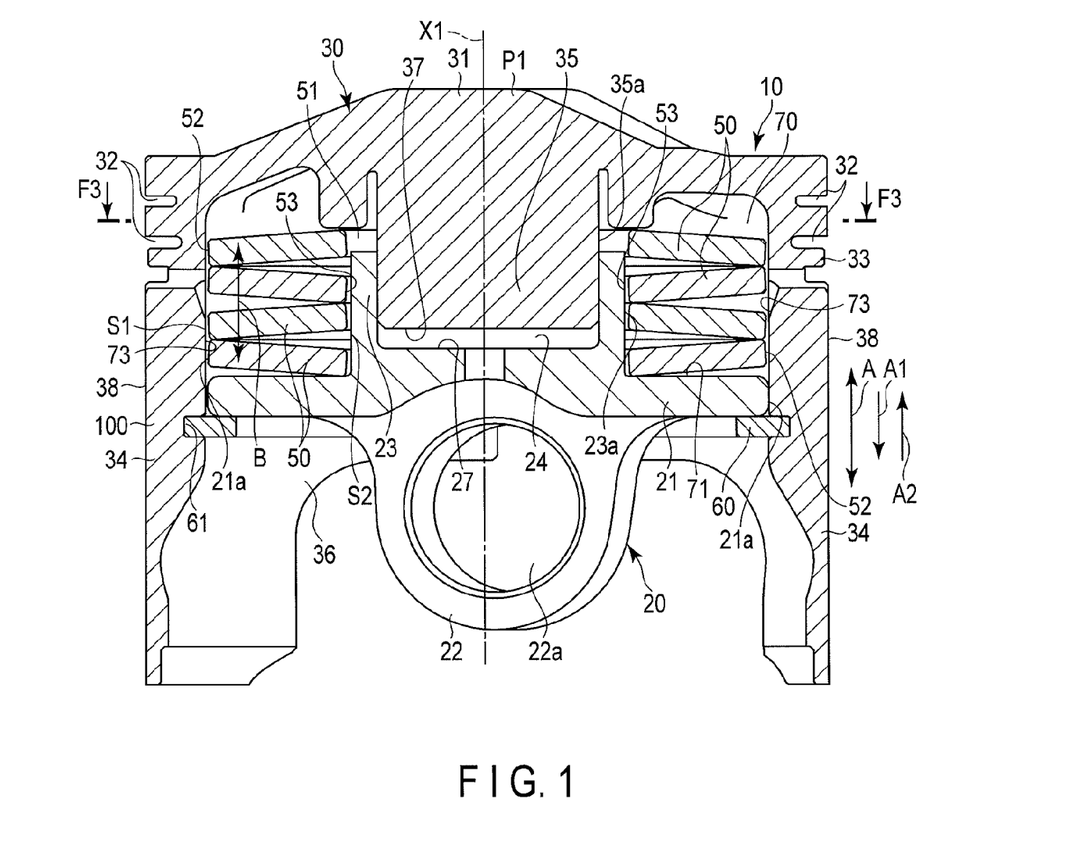
FIG. 1 is a sectional view of a piston according to an embodiment of this invention.
Figure 2:
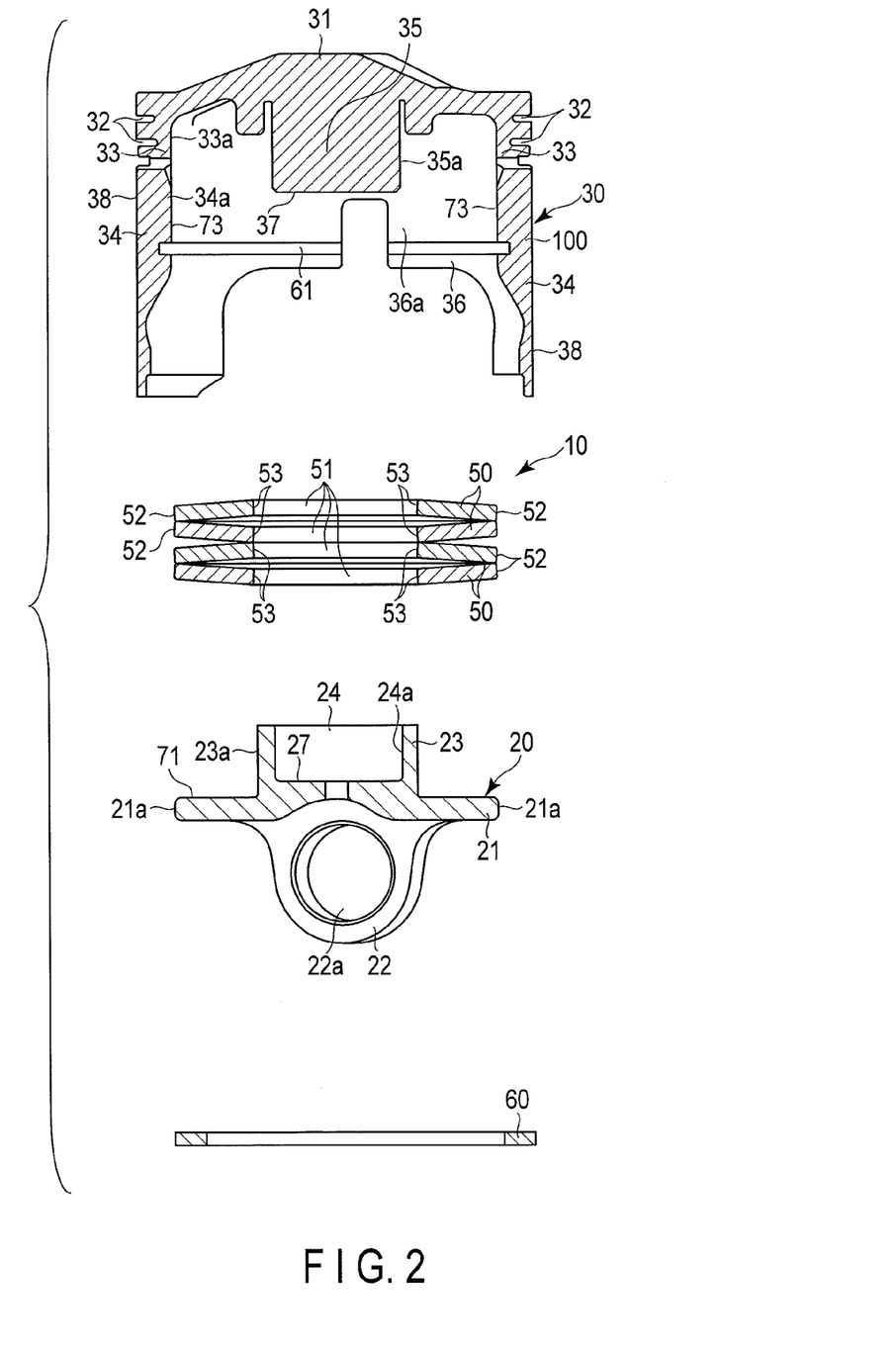
FIG. 2 is sectional views showing the piston of FIG. 1 in an exploded state.

A piston according to an embodiment of this invention will be described with reference to the FIGS. 1 to 5. FIG. 1 is a sectional view of the piston 10. FIG. 2 is sectional views showing the piston 10 in an exploded state. As shown in FIGS. 1 and 2, the piston 10 comprises a base piston unit 20, a moving piston unit 30, a plurality of disc springs 50, and a retaining ring 60.

The base piston unit 20 has a main part 21, a piston boss 22, and a base-side projection 23. The main part 21 has, for example, a circular planar shape and has a specific thickness. The piston boss 22 is formed on the main part 21. The piston boss 22 is a component to which a connecting rod (not shown) may be coupled. The piston boss 22 has a pin hole 22a through which a piston pin may extend to couple the piston rod to the piston boss 22.

The base-side projection 23 is formed on the main part 21 and protrudes from the side facing away from the piston boss. The base-side projection 23 will be described later in detail.

Figure 3:
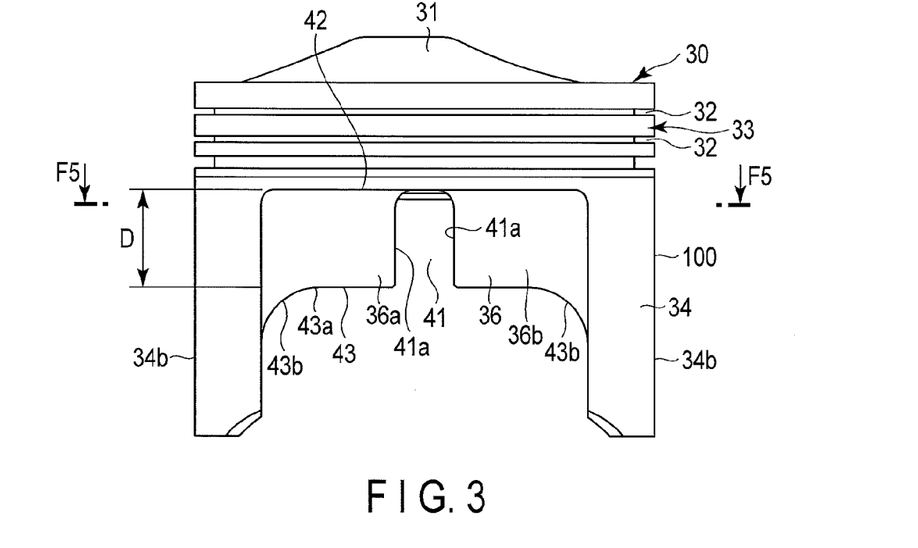
FIG. 3 is a side view showing the moving piston unit of the piston shown in FIG. 1.

FIG. 3 is a side view showing the moving piston unit 30. In FIG. 3, the moving piston unit 30 is shown as viewed in the direction orthogonal to the directions A in which the moving piston unit 30 may reciprocate with respect to the base piston unit 20 as will be described later. The direction A of reciprocation is linear and parallel to the central axis X1 of the pistons 10. As shown in FIGS. 1 to 3, the moving piston unit 30 comprises a piston head 31, a ring part 33, skirt parts 34, side-wall parts 36, and a moving-part side projection 35. The ring part 33 has a ring groove 32.

The planer shape of the piston head 31 is circular. The ring part 33 is formed at the periphery of the piston head 31, and is an annular wall continuous to the piston head 31 in the circumferential direction. A pair of skirt parts 34 is continuous to, and formed integral with, the ring part 33. One skirt part 34 and the other skirt part 34 are arranged opposite to each other across the center C of the moving piston unit 30, as seen in the direction A in which the moving piston unit 30 may reciprocate as will be described later. The central axis X1 of the piston 10 passes through the center C. The outer circumferential surface 33b of the ring part 33 is flush with the outer circumferential surface of the each skirt part 34. These surfaces are parallel to the directions in which the piston 10 reciprocates in the cylinder (not shown).

The side-wall parts 36 are provided as a pair. Each side-wall part 36 stands from the ring part 33 and couples the skirt parts 34 to each other. Therefore, the skirt parts 4 and the side-wall part 36 constitute an annular and continuous circumferential wall 100.

Figure 4:
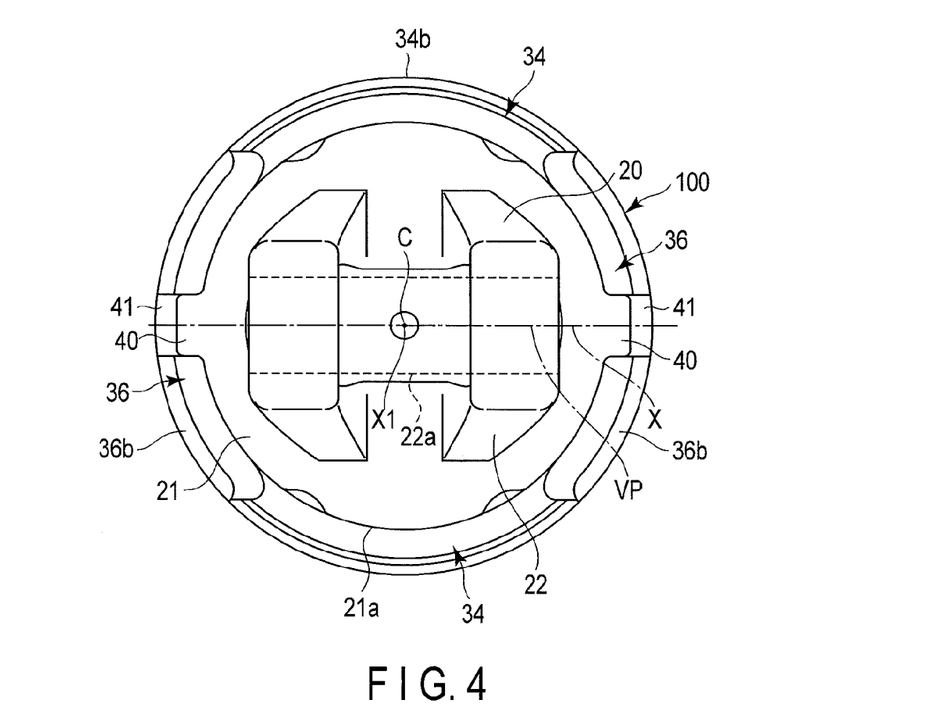
FIG. 4 is a bottom view of the piston shown in FIG. 1, showing the moving piston unit and base piston unit combined together.

FIG. 4 is a bottom view showing a state in which the moving piston unit 30 and the base piston unit 20 are combined with each other, as viewed from the piston boss 22. Note that FIG. 4 shows the piston 10 without the retaining ring 60, which will be described later.

As shown in FIG. 4, the outer circumferential surface 34b of either skirt part 34 defines an arc surface around the central axis X1 of the piston 10. As seen from FIGS. 3 and 4, the outer circumferential surface 36b of the side-wall part 36 lies inside an imaginary arc surface extending from the outer circumferential surface 34b of either skirt part 34. That is, the side-wall part 36 is concaved inwards from the skirt part 34, in the diameter direction of the moving piston unit. In other words, the side-wall part 36 has outer circumferential surface 36b concaved toward the central axis X1, from the outer circumferential surface 34b of the skirt part 34. This is an exemplary side-wall part concaved toward the piston central axis, according to the present invention.

As FIG. 1 shows, the moving-part side projection 35 is provided in a space defined by the piston head 31, ring part 33, skirt parts 34 and side-wall parts 36, and is arranged in the piston head 31. The moving-part side projection 35 protrudes inwards. The moving-part side projection 35 will be later described in detail.

The base piston unit 20 is housed in the space the moving piston unit 30 has in it, and is movable relative to the moving piston unit 30. The space in the moving piston unit 30 is large enough to allow the main part 21 to fit in and to reciprocate.

More specifically, the inner circumferential surface 73 of the moving piston unit 30 is composed of the inner circumferential surface 33a of the ring part 33, the inner circumferential surfaces 34a of the skirt parts 34, and the inner circumferential surfaces 36a of the side-wall parts 36. The surface 73 allows the main part 21 of the base piston unit 20 to reciprocate in the inner space. Arrows A show the reciprocation directions A in which the moving piston unit 30 reciprocates with respect to the base piston unit 20. The reciprocation directions A of the moving piston unit 30 with respect to the piston base unit 20 are parallel to the directions in which the piston 10 reciprocates in the cylinder (not shown). As described above, the reciprocation directions A are parallel to the central axis X1 of the piston 10.

As shown in FIG. 2, a groove 61 is made in the inner wall part of the skirt parts 64. The groove 61 has an annular shape. The retaining ring 60 having a continuously annular shape is housed in the groove 61. The retaining ring 60 is fitted in the groove 61 as shown in FIG. 1, as long as the moving piston unit 30 remains combined with the base piston unit 20, or as long as the base piston unit 20 remains incorporated in the moving piston unit 30. Thus, the retaining ring 60 is fitted in the groove 61, in the state shown in FIG. 1.

As shown in FIG. 1, a part of the retaining ring 60 protrudes from the groove 61 into the space provided in the moving piston unit 30. The main part 21 of the base piston unit 20 abuts on the retaining ring 60, preventing the base piston unit 20 from leaving the moving piston unit 30.

The base-side projection 23 and the moving-part side projection 35 will be described below. As shown in FIG. 1, the moving-part side projection 35 is arranged in the moving piston unit 30 and located on the side opposite to the piston head 31. The moving-part side projection 35 is shaped like, for example, a circular pillar, and extends in the reciprocation directions A. As the moving-part side projection 35 is viewed in the reciprocation directions A, the center of the moving-part side projection 35 aligns with the center of the moving piston unit 30. The moving piston unit 30 has a cross section that is, for example, a circle, taken along a line perpendicular to the reciprocation directions.

As shown in FIG. 1, the base-side projection 23 is formed at the main part 21 of the base piston unit 20 and is opposed to the piston boss 22. The base-side projection 23 extends in the reciprocation directions A. As viewed in the reciprocation directions A, the center of the base-side projection 23 overlaps the center of the base piston unit 20. Note that the center of the base piston unit 20 is the center of the main part 21. The central axis X1 passes through the center of the base piston unit 20. The base-side projection 23 has a fitting groove 24, in which the moving-part side projection 35 is fitted, able to reciprocate.

Since the moving-part side projection 35 is fitted in the fitting groove 24 of the base-side projection 23, the moving piston unit 30 is guided while it is reciprocating with respect to the base piston unit 20. This enables the moving piston unit 30 to reciprocate smoothly with respect to the base piston unit 20.

The state of the piston 10 will be explained below. The moving piston unit 30 can move toward the base piston unit 20 in direction A1 and away from the base piston unit 20 in direction A2. The state in which the moving piston unit 30 stays at the remotest position from the base piston unit 20 shall be called "initial state P1." FIG. 1 is a sectional view of the piston 10, taken along a line passing the center of the base piston unit 20, i.e., central axis X1, and extending parallel to the reciprocation directions A.

The state in which the moving piston unit 30 stays at the nearest position to the base piston unit 20 shall be called "most compressed state." In the most compressed state, the distal end 37 of the moving-part side projection 35 assumes a plane contact with the bottom 27 of the fitting groove 24, and the moving piston unit 30 cannot further approach the base piston unit 20. Therefore, the length of the moving-part side projection 35 predetermined with respect to the piston 10, on the basis of the state in which the moving piston unit 30 is the most close to the base piston unit 20. The plurality of disc springs 50 are provided in a receptacle 70. The plurality of disc springs 50 are identical. Each disc spring 50 has a circular planer shape, and has, in the center part, holes 51 through which the projections 23, 35 extend, respectively. The disc springs 50 overlap one on another in direction B. The direction B is the direction in which the disc springs 50 may flex and which is parallel to the reciprocation directions A. Each disc spring 50 is an example of the elastic member used in the present invention.

Note that each disc spring 50 may expand and contract, changing its diameter. How the diameter of the disc spring 50 changes as the spring 50 expands or contract depends on its shape and size. Hence, the disc spring 50 can be of any type, whether its diameter is maximal when it expands to its free height, or when it is compressed. This embodiment will be described, on the assumption that the disc springs 50 are of the type which has the maximal diameter when compressed.

The disc springs 50 are held in the receptacle 70, each compressed with an initial load. The disc springs 50 are therefore biased, because of their elastic force, pushing the moving piston unit 30 away from the base piston unit 20. As a result, the piston 10 is held in the initial state P1. If a force greater than the initial load is applied to the disc springs 50, the disc springs 50 are compressed, moving the moving piston unit 30 toward the base piston unit 20. The piston 10 is thereby compressed.

A continuous, annular gap S1 is provided between the outer edge 52 of each disc spring 50 and the inner circumferential surface 73 of the receptacle 70. In other words, the size of each disc spring 50 and the size of the space in the receptacle 70 are determined so that the gap S1 may be provided between the disc spring 50 and the inner circumferential surface 73. The gap S1 has such a size that the outer edge 52 of each disc spring 50 will not contact the inner circumferential surface 73 of the receptacle 70 even if the piston 10 assumes a maximal compressed state P2 and the disc springs 50 are therefore compressed, each expanding in the circumferential direction.

The relation the base-side projection 23 has, in terms of its shape, with the disc springs 50 will be explained. The base-side projection 23 has such a size that a continuous, annular gap S2 is provided between the outer circumferential surface 23a of the base-side projection 23 and the inner edge of each disc spring 50 if the center of the disc spring 50 aligns with the center of the base piston unit 20.

The gap S2 is broad enough to make the disc springs 50 contact, at inner edge 53, the outer circumferential surface 23a of the base-side projection 23 before their outer edges 52 contact the inner circumferential surface 73 of the receptacle 70, even if the disc springs 50 move in the receptacle 70 in a direction crossing the reciprocation directions A.

To be more specific, while the piston 10 remains in the initial state P1 and while the center of the moving-part side projection 35 remains aligning with the center of the base piston unit 20 as viewed in the reciprocation directions A, the gap S1 has a uniform length in the diameter direction, at any position in the circumferential direction. The gap S2 is therefore uniform in the circumferential direction. Hence, the length of the gap S2, measured along the diameter, is uniform at any position in the circumferential direction. At this point, the gap S2 along the diameter of the disc spring 50 is smaller than the gap S1 along the diameter of the disc springs 50.

The piston 10 has a rotation preventing structure, which prevents the moving piston unit 30 from rotating with respect to the base piston unit 20. The rotation preventing structure comprises rotation preventing projections 40. In other words, the base piston unit 20 has rotation preventing projections 40. The rotation preventing projection 40 is an example of a projection member used in the present invention.

As shown in FIG. 4, two rotation preventing projections 40, for example, are provided. The rotation preventing projections 40 are arranged, one opposed to the other across the center of the main part 21, as viewed in the reciprocation directions A. Each rotation preventing projection 40 protrudes outwards from the outer circumferential surface 21a of the main part 21 in a direction perpendicular to the reciprocation directions A. In other words, each rotation preventing projection 40 extends perpendicular to the central axis X1 of the piston 10. Each rotation preventing projection 40 has a thickness smaller than the thickness L1 of the side-wall parts 36, which will be described later.

The positional relation the rotation preventing projections 40 have with the piston boss 22 will be described. In FIG. 4, one-dot, dashed lines indicate the pin hole 22a that is made in the piston boss 22. The rotation preventing projections 40 are arranged in a plane including the center line X of the pin hole 22a and the central axis X1 of the piston. The center line X is indicated by a one-dot, dashed line in FIG. 4. The word "plane," which is used here, means an imaginary plane indicated by the one-dot, dashed line and labeled VP in FIG. 4. The plane VP overlaps the center line X. In fact, however, it extends along the central axis X1 of the piston 10.

Each of the side-wall parts 36 has a penetration part 41, in which one rotation preventing projection 40 is inserted. The penetration parts 41 is a groove which extends in the reciprocation directions A from that end of the side-wall part 36, which faces away from the piston head 31, and which opens at that end 43 of the side-wall part 36, which faces away from the piston head 31. The penetration parts 41 extend in the reciprocation directions A to that end 42 on the piston head 31 of the side-wall part 36. The penetration parts 41 extend in the thickness direction of the side-wall part 36 and penetrate the side-wall part 36.

The moving piston unit 30 is combined with the base piston unit 20 such that the rotation preventing projections 40 are fitted in the penetration parts 41. Therefore, as shown in FIG. 4, the skirt parts 34 oppose each other as viewed in the reciprocation directions A, in the direction orthogonal to the direction in which the pin hole 22a extends with respect to the pin boss 22. Fitted in the penetration parts 41, the rotation preventing projections 40 abut on those sides 41a of the penetration part 41, which oppose in the circumferential direction of the penetration parts 41, and are held between these sides 41a. The rotation preventing projections 40 are thereby suppressed from moving in the circumferential direction of the base piston unit 20. As a result, the moving piston unit 30 is prevented from rotating with respect to the base piston unit 20.

The thickness L1 of the side-wall parts 36 and the thickness L2 of the skirt parts 34 will be described. The word "thickness" used here means the thickness measured in the diameter passing the center C of the moving piston unit 30, in the plane perpendicular to the reciprocation directions A. That is, the thickness is measured along a line passing the center C of the moving piston unit 30.

The thickness L1 of the side-wall parts 36 and the thickness L2 of the skirt parts 34 have a relation of L2>L1 at any position in the reciprocation directions A on a plane perpendicular to the reciprocation directions A, in region D in which the penetration part 41 is formed and extends in the reciprocation directions A.

Figure 5:
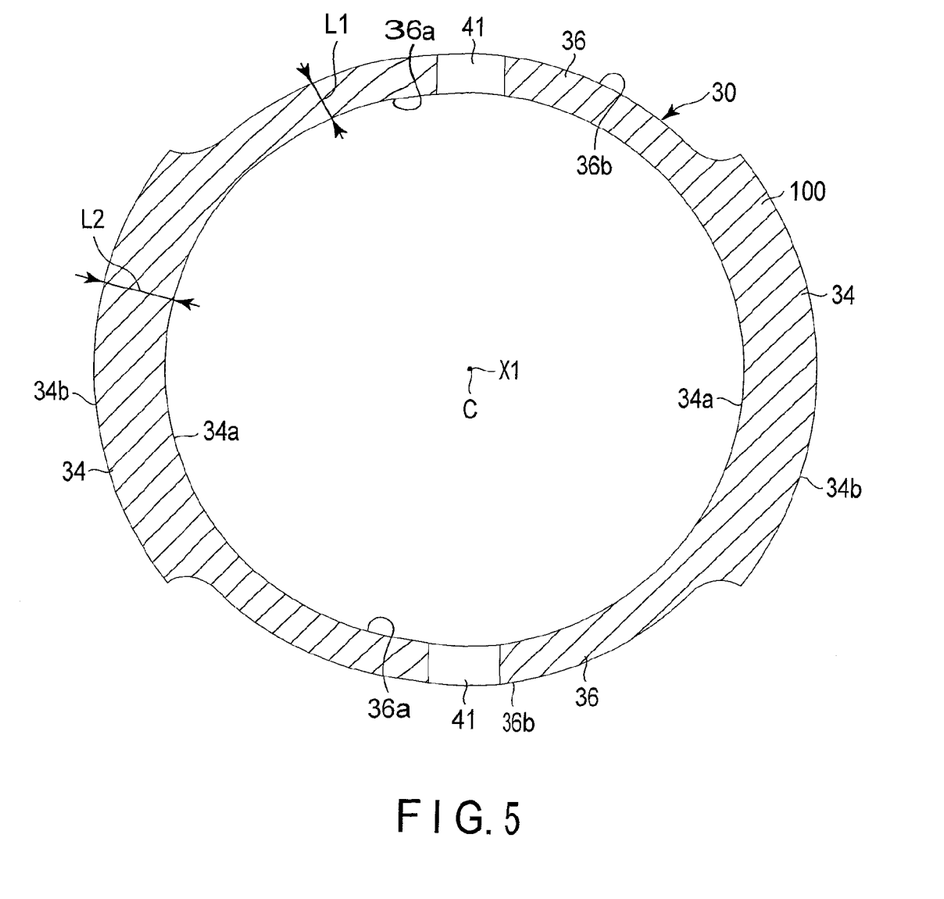
FIG. 5 is a sectional view of the moving piston unit, taken along line F5-F5 shown in FIG. 3.

FIG. 5 is a sectional view of the moving piston unit, taken along line F5-F5 shown in FIG. 3. The sectional view of FIG. 5 is concerned with a position in the region D. As seen from FIG. 5, L2>L1. In this region D, L2>L1 even at any other position along the reciprocation directions A.

The penetration parts 41 are formed, each extending from that end 42 of each side-wall part 36, which faces the piston head 31, and that end 43 of the side-wall part 36, which faces away from the piston head 31. At the end 43, each side-wall part 36 has a straight part 43a and a connection part 43b. The straight part 43a extends perpendicular to the reciprocation directions A, and the connection part 43b is coupled, at ends, respectively to the skirt parts 34. The connection part 43b is shaped like an arc. More precisely, the penetration parts 41 are formed, each extending from the end 42 of one side-wall part 36 to the straight part 43a.

How the piston 10 is assembled will be explained. First, the moving piston unit 30 is aligned in position with the base piston unit 20. At this point, the rotation preventing projections 40 are aligned with the penetration parts 41, respectively, and the base-side projection 23 is aligned with the moving-part side projection 35. The penetration parts 41 extend in the reciprocation directions A and opens to the end 43 of the side-wall part 36. The rotation preventing projections 40 are therefore smoothly inserted into the penetration parts 41 through the opening.

Then, the retaining ring 60 is fitted into the groove 61. The retaining ring 60 prevents the base piston unit 20 and the moving piston unit 30 from leaving each other.

In the piston 10 so assembled, the penetration parts 41 are provided on the side-wall part 36 that is concaved inwards from the outer surfaces of the skirt parts 34. Therefore, the penetration parts 41 do not scrape, at an edge, the lubricating oil from the interface between the piston 10 and the inner surface of the cylinder. Hence, the lubrication between the piston 10 and the inner surface of the cylinder will not be impaired.

While the piston 10 is reciprocating in the cylinder, the rotation preventing projections 40 remain fitted in the penetration parts 41. The moving piston unit 30 is therefore prevented form rotating with respect to the base piston unit 20.

While reciprocating in the cylinder, the piston 10 may be biased in the direction perpendicular to the plane VP including the center line X of the pin hole 22a and the central axis X1 of the piston center of the piston. That is, the piston 10 may be biased in the thrust direction. In this case, the moving piston unit 30 may incline to the base piston unit 20. Nonetheless, the inclination of the moving piston unit 30 to the base piston unit 20 can be suppressed, because the rotation preventing projections 40 and the penetration parts 41 are arranged in the plane VP including the center line X of the pin hole 22a and the central axis X1 of the piston center of the piston. Further, the rotation preventing projections 40 can be prevented from slipping out of the penetration parts 41.

If a load is so exerted on the skirt parts 34, it will be transmitted to the side-wall part 36 provided between the skirt parts 34. The side-wall part 36 is less thick than the skirt parts 34 as specified above, and has the penetration parts 41. The side-wall part 36 is therefore liable to deform, and may flex a little. If the side-wall part 36 flexes, it will absorb the load exerted on the skirt parts 34.

Since the penetration parts 41 penetrate the side-wall part 36 in the thickness direction thereof, the side-wall part 36 is more liable to deform. The load exerted on the skirt parts 34 is absorbed more efficiently. Hence, the increase in siding resistance between each skirt part 34 and the inner surface of the cylinder can be suppressed.

Since the penetration parts 41 open to the end 43 of the side-wall part 36, the load exerted on the skirt parts 34 is easy to absorb. Once the load has been absorbed, the increase in siding resistance between each skirt part 34 and the inner surface of the cylinder can be suppressed.

Further, since the penetration parts 41 open to the end 43 of the side-wall part 36 and extends in the reciprocation directions A, the rotation preventing projections 40 can be fitted in the penetration parts 41 merely by inserting the base piston unit 20 in the inner space in the moving piston unit 30. As result, the efficiency of assembling the piston 10 increases.

Moreover, since the thickness of the rotation preventing projections 40 is smaller than the thickness of the side-wall part 36, rotation preventing projections 40 will never contact the inner surface of the cylinder. Therefore, the rotation preventing projections 40 will not impair the sliding of the piston 10 in the cylinder.

Further, since the penetration parts 41 penetrate the side-wall part 36, it is possible to reduce the area at which the rotation preventing projections 40 contact the penetration parts 41.

This embodiment has, for example, two rotation preventing projections 40 and two penetration parts 41. However, it may have only one rotation preventing projection or three or four rotation preventing projections. In short, it may have a plurality of rotation preventing projections. In this case, the number of penetration parts provided is the same that of rotation preventing projections used.

Fitted in the fitting groove 24 slidably, the moving-part side projection 35 can be reliably prevented the base piston unit 20 and the moving piston unit 30 from being displaced from each other. That is, the moving piston unit 30 will not incline to the base piston unit 20 or be displaced from the base piston unit 20 along the axis of the piston pin.

Further, the base-side projection 23 is provided on a side of the main part 21 and the receptacle 70 is shaped like a hollow cylinder. A disc spring, which has a generally circular planer shape and a hole at its center, can therefore be utilized without being processed in a specific way. Still further, the disc springs 50 can be prevented from moving in the receptacle 70, because the base-side projection 23 and moving-part side projection 35 pass through the holes 51 of the disc springs 50.

The present invention is not limited to the embodiments described above. The components of any embodiment can be modified in various manners in reducing the invention to practice, without departing from the sprit or scope of the invention. Further, the components of any embodiment described above may be combined, if necessary, in various ways to make different inventions. For example, some of the components of any embodiment may not be used.

The invention claimed is:

1. A piston, comprising:
 a base piston unit comprising a piston boss having a pin hole;
 a moving piston unit having a piston head and a circumferential wall part surrounding an entire circumference of the piston head and extending in reciprocation directions of the piston, holding the base piston unit in the circumferential wall part and being able to reciprocate with respect to the base piston unit; and
 an elastic member provided between the base piston unit and the moving piston unit and configured to expand and contract as the moving piston unit reciprocates with respect to the base piston unit,
 wherein the circumferential wall part has a pair of skirt parts opposing each other across the piston boss and a pair of side-wall parts coupling the skirt parts and each having an outer circumferential surface concaved toward a central axis of the piston;

the side-wall parts have a penetration part each, which penetrates the side-wall part and which extends in the reciprocation directions;

the base piston unit has projections extending perpendicular to the central axis of the piston and inserted in the penetration parts, a base-side projection that extends in a direction parallel to the reciprocating direction, and a fitting groove provided inside the base-side projection and opened toward an inner wall of the piston head in the reciprocating direction opposing the piston boss;

the moving piston unit has a moving-part side projection shaped like a circular pillar and extending in the circumferential direction opposing the piston head to engage into the fitting groove, enabling the same to slide; and the elastic member is a disc spring having a hole at its center where the base-side projection and the moving-part side projection pass therethrough, and is provided between the base-side projection and the circumferential wall part of the moving piston unit.

2. The piston according to claim 1, wherein
the penetration parts and the projections are arranged in a plane including the central axis of the piston and a central axis of the pin hole.

3. The piston according to claim 2, further comprising:
a receptacle holding the elastic member, provided between the base piston unit and the moving piston unit and having a volume that changes as the moving piston unit reciprocates with respect to the base piston unit.

4. The piston according to claim 3, wherein
the base piston unit has a main part fitted inside the circumferential wall part and having a circular planer shape;
and
the elastic member is held in the receptacle that is a space shaped like a hollow cylinder and defined by the main part, the base-side projection, the inner circumferential surface of the moving piston unit and the moving-part side projection.

5. The piston according to claim 1, further comprising:
a receptacle holding the elastic member, provided between the base piston unit and the moving piston unit and having a volume that changes as the moving piston unit reciprocates with respect to the base piston unit,
wherein the moving-part side projection, extends from the inner wall of the piston head side toward the receptacle in the reciprocation direction.

6. The piston according to claim 5, wherein
the base piston unit has a main part fitted inside the circumferential wall part and having a circular planer shape;
and
the elastic member is held in the receptacle that is a space shaped like a hollow cylinder and defined by the main part, the base-side projection, the inner circumferential surface of the moving piston unit and the moving-part side projection.

7. The piston according to claim 1, wherein
the base piston unit has a main part having a circular planar shape and engaged with an inside of the circumferential wall part; and
the projections protrude outwards from an outer circumferential surface of the main part in a direction perpendicular to the reciprocation directions.

8. The piston according to claim 7, wherein
the penetration parts and the projections are arranged in a plane including the central axis of the piston and a central axis of the pin hole.

9. The piston according to claim 8, further comprising:
a receptacle holding the elastic member, provided between the base piston unit and the moving piston unit and having a volume that changes as the moving piston unit reciprocates with respect to the base piston unit,
wherein the moving-part side projections extends from the inner wall of the piston head side toward the receptacle in a direction parallel to the reciprocation direction.

10. The piston according to claim 9, wherein
the base piston unit has a main part fitted inside the circumferential wall part and having a circular planer shape;
and
the elastic member is held in the receptacle that is a space shaped like a hollow cylinder and defined by the main part, the base-side projection, the inner circumferential surface of the moving piston unit and the moving-part side projection.

11. The piston according to claim 7, further comprising:
a receptacle holding the elastic member, provided between the base piston unit and the moving piston unit and having a volume that changes as the moving piston unit reciprocates with respect to the base piston unit,
wherein the moving-part side projection extends from the inner wall of the piston head side toward the receptacle in a direction parallel to the reciprocation direction.

12. The piston according to claim 11, wherein
the base piston unit has a main part fitted inside the circumferential wall part and having a circular planar shape;
and
the elastic member is held in the receptacle that is a space shaped like a hollow cylinder and defined by the main part, the base-side projection, the inner circumferential surface and the moving-part side projection.

13. The piston according to claim 1, wherein
the penetration parts open at a side facing away from the piston head in the reciprocation direction.

* * * * *